United States Patent [19]
Cherry et al.

[11] Patent Number: 5,719,400
[45] Date of Patent: Feb. 17, 1998

[54] HIGH RESOLUTION DETECTOR ARRAY FOR GAMMA-RAY IMAGING

[75] Inventors: Simon R. Cherry; Yiping Shao, both of Los Angeles; Stefan B. Siegel, Reseda; Robert W. Silverman, Sherman Oaks, all of Calif.

[73] Assignee: The Regents of the University of California, Oakland, Calif.

[21] Appl. No.: 512,175

[22] Filed: Aug. 7, 1995

[51] Int. Cl.[6] .......................... G01T 1/202; G01T 1/166
[52] U.S. Cl. .................. 250/368; 250/363.03; 250/367; 250/369
[58] Field of Search ........................ 250/367, 368, 250/363.03, 369

[56] References Cited

U.S. PATENT DOCUMENTS

| | | | |
|---|---|---|---|
| 4,145,610 | 3/1979 | Perilhou | 250/367 |
| 4,206,361 | 6/1980 | Hounsfield et al. | 250/366 |
| 4,598,202 | 7/1986 | Koechner | 250/367 |
| 4,933,961 | 6/1990 | Rushbrooke et al. | 250/367 |
| 4,939,464 | 7/1990 | Hammer | 250/368 |
| 5,038,042 | 8/1991 | Hansen et al. | 250/368 |
| 5,325,855 | 7/1994 | Daghighian et al. | 250/368 |
| 5,338,937 | 8/1994 | Daghighian et al. | 250/368 |
| 5,391,878 | 2/1995 | Petroff | 250/368 |
| 5,550,378 | 8/1996 | Skillicorn et al. | 250/367 |

FOREIGN PATENT DOCUMENTS

| | | |
|---|---|---|
| 2 645 706 | 10/1990 | France. |
| 1 484 132 | 8/1977 | United Kingdom. |
| 2 253 274 | 9/1992 | United Kingdom. |

OTHER PUBLICATIONS

Hayashi, "New Photomultiplier Tubes for Medical Imaging", IEEE Trans. Nucl. Sci., 36(1), Feb. 1989.

M.E. Casey and R. Nutt, "A Multicrystal Two Dimensional BGO Detector System for Positron Emission Tomography," *IEEE Transactions on Nuclear Science*, vol. 33, No. 1, Feb. 1986.

J.G. Rogers, et al., "An Improved Multicrystal 2-D BGO Detector for PET", *IEE Transactions on Nuclear Science*, vol. 39, No. 4, 1992.

Tetsuo Matsumoto, "Dos Equivalent Measurement for Thermal Neutrons and Gamma Rays with a Small BGO Scintillator Connected to an Optical Fibre," *Radiation Protection Dosimetry*, vol. 35, No. 4, pp. 241–245 (1991), Nuclear Technology Publishing.

*Primary Examiner*—Carolyn E. Fields
*Attorney, Agent, or Firm*—Michael J. Ram; Marvin H. Kleinberg; Marshall A. Lerner

[57] ABSTRACT

A gamma ray detection and locating system comprising an array of scintillator crystals connected to a multichannel photomultiplier tube by discrete optical fibers, each fiber connecting a single crystal to a corresponding specific location on the face of the photomultiplier tube. Also described is an improved system for identifying the location of specific electrodes in the photomultiplier tube receiving electrons generated by photons flowing from the crystal along the fiber to the tube.

2 Claims, 5 Drawing Sheets

NOTE: ALL RESISTORS ARE IN kΩ

NOTE: ALL RESISTORS ARE IN kΩ

NOTE: ALL RESISTORS ARE IN kΩ

HIGH RESOLUTION DETECTOR ARRAY FOR GAMMA-RAY IMAGING

BACKGROUND

The present invention relates to a high resolution array for detecting and locating gamma ray emission sites during a PET (positron emission tomography) scanning procedure comprising scintillator elements coupled to a multi-channel photomultiplier tube by optical fibers. More particularly, the invention relates to an array of square bismuth germanium oxide (BGO) crystals having a fiber optic connected between each crystal and a multi channel photomultiplier tube (MC-PMT) and a series-parallel arrangement of resistors suitable positioned to allow the location of specific gamma-ray activated crystals.

The BGO block design disclosed by M. E. Casey and R. Nutt in 1986 (M. E. Casey and R. Nutt, "A multicrystal two dimensional BGO detector system for positron emission tomography," IEEE Trans Nucl Sci, vol. NS-33, pp. 460–463, 1986) is used in the majority of commercial PET systems. This consists of a segmented single crystal of BGO mounted directly to the face of four photomultiplier tubes arranged in a square, or to a single light guide positioned between the crystal array and the PMTs, the face of the PMT being rectangular in shape. The principal advantage of such an array over single crystal photomultiplier tube configurations is that smaller BGO element sizes can be used, resulting in a high spatial resolution. A traditional block design using rectangular cross section PM tubes provides almost 100% coupling area between the scintillator block and photo cathodes. However, a disadvantage of the block design is reduced count-rate performance and erroneous outputs when multiple events occur at one time which can result in a loss of data and a misidentification of the gamma-ray activated crystal portion.

These rectangular PM tubes are not readily available and they are very expensive. In contrast, round PM tubes are readily available and relatively inexpensive. A disadvantage of using round PM tubes in a square space is the inability to detect all emissions impinging on the square space and collect sufficient scintillation light in areas of the tube adjacent the corners of the square. A round tube covers only 78.5% of the space encompassed in a square surrounding that tube (some times referred to as the coupling area). Because of the size of available PMT's (either round or square) it is difficult to construct detectors with BGO elements smaller than 3 mm×3 mm. To obtain high spatial resolution, small BGO elements must be used.

Multi-channel PMT's are available containing a large number of PMT channels in a single package. However, in all cases, there is significant dead space surrounding the active region in these devices. Because of the large number of channels in a complete PET scanner device, it is desirable to multiplex the signals produced by the multi-channel PMT. This has conventionally been achieved using simple charge division from each electrode in the PMT (FIG. 4).

Further, the traditional construction to allow location of the particular activated crystal, shown in FIG. 4, utilizes 4 resistors attached to each site on the photomultiplier tube, the resistors each being part of a separate electrical path. As a result 256 resistors are required to readout an 8×8 array and reduce the signals to four position sensitive signals. By measuring and comparing the voltage transmitted from each of these four outputs, the location of the activated site can be determined. This construction is overly complicated, has a large number of electrical connections which increases the risk of failure, malfunction and electrical pickup, and the large number of components though which the fast PMT signals must travel distorts the signals, reducing signal-to-noise levels and degrading the waveform of the signals, thus degrading timing resolution.

A particular problem relates to the size of the combination of the scintillation crystal mounted directly to the PMT with or without the intervening light pipe. Because of the size of the PMT and attached electronics it is difficult to mount a series of scintillation crystals adjacent to each other to form a plate or ring of crystals surrounding the object which is emitting gamma rays without leaving spaces between adjacent sets of crystals.

Thus there is a need for an inexpensive, easily assembled array capable of forming into a plate or ring of arrays for receiving 100% of all emissions from a target and suitably arranged for accurate identification of sites in the array which are activated.

SUMMARY

These needs are met by the present invention which comprises a scintillator array of square bismuth germanium oxide (BGO) crystals, each crystal being individually connected by a fiber optic link to a multichannel photomultiplier tube (MC-PMT). This arrangement has particular utility as a detector for use in high resolution gamma ray imaging in medical and industrial applications.

DRAWINGS

These and other features, aspects and advantages of the present invention will become better understood with reference to the following description, appended claims, and accompanying drawings, where:

DESCRIPTION

Figure 1:
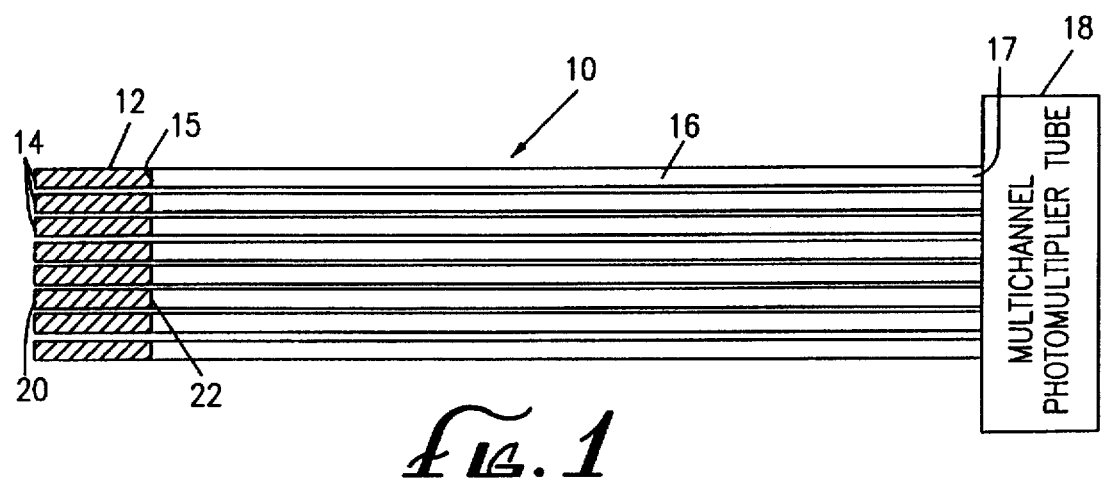
FIG. 1 is a cross sectional schematic representation of a gamma ray imaging detector incorporating the invention.

FIG. 1 shows a schematic representation of a gamma ray imaging detector 10, incorporating the invention, comprising a scintillator array 12 of individual bismuth germanium oxide crystals 14. Each crystal 14 has an exposed surface 20 and a transmission surface 22. Attached to the transmission surface 22 of each crystal 14 is a first end 15 of an optical fiber 16. The second end 17 of each fiber 16 is attached to the receiving surface of a multichannel photomultiplier tube 18, the attachment being made so that the location of the crystal 14 attached to a fiber 16 is identifiable. Because there is little cross talk in a good MC-PMT each channel acts as an individual photomultiplier tube. The result is a one to one coupling between scintillator elements and photon detector. Extremely small scintillation elements can be used because this arrangement leads to a very high spatial resolution. The optical fiber coupling provides compensation for the considerable dead space of the MC-PMT where packing fraction is important and allows correction for pitch differences between the MC-PCT pixels and the scintillator array.

A major advantage of this system, because of the low light output of scintillators such as BGO, is it obviates the need to share scintillation light among multiple elements for position identification as required by gamma cameras or PET block detectors. As a result, identification of the site of activity is less sensitive to the amount of scintillation light generated by low light output scintillators such as BGO.

In a first embodiment the array consists of an 8×8 array of 2×2×10 mm polished BGO crystals. To avoid crossover between crystals, the crystals are separated by a gap of 250 μm which is filled with dry MgO powder. The resultant structure consists of 64 crystals in a square array having an exposed surface of slightly greater than 16×16 mm. Each crystal is coupled, via a 28 cm length of 2 mm diameter double clad optical fiber 16, to a multichannel photomultiplier tube. The pixel pitch on the PMT is 2.54. Attachment of the fiber to the crystal is accomplished by using an optical grade epoxy resin or an adhesive. A suitable epoxy resin is identified as EPOTEK 301-2. Operable units have been fabricated using a polystyrene core optical fiber enclosed double clad in a polymethylmethacrylate covering, the fiber having a numerical aperture of 0.72, supplied by Kuraray, Japan, and a Phillips XP 1722 or XP 1702 MC-PMT.

Figure 2:
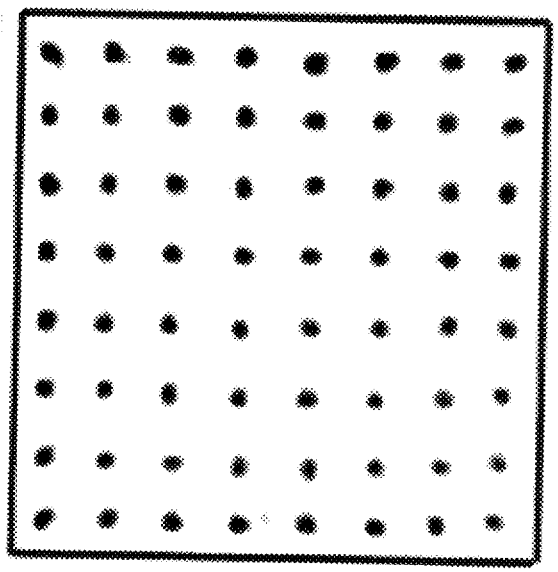
FIG. 2 is a plot of the position information obtained for a 511 keV source.

Using this arrangement when a BGO crystal is irradiated by a 511 eV source the number of photoelectrons generated at a typical pixel in the photomultiplier tube was approximately 50 at a fiber length of 18 cm and about 45 at a length of 28 cm. Using a charge-division readout scheme involving a resistor network, discussed below, the output of the 64 crystals is reduced to 4 position sensitive signals, the combination of which is related to a crystal position in the array. FIG. 2, which is a plot of the position information obtained for a 511 keV source, shows this arrangement to provide excellent separation of outputs from the crystals, allowing identification of specific activated crystals. This response is a direct consequence of using discrete scintillator/photon detector elements and the splitting of the amplified charge rather than splitting the limited amount of light emitted by each crystal.

Figure 3:
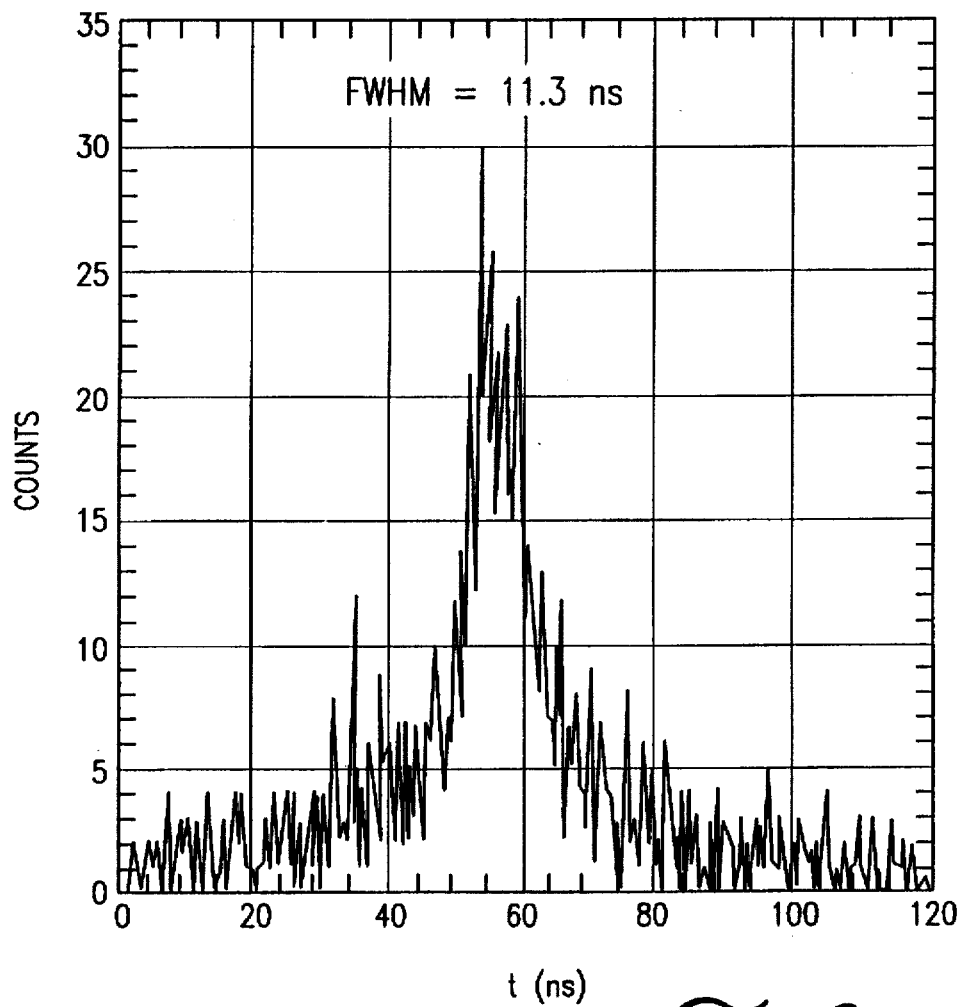
FIG. 3 shows the timing spectrum for two BGO optical fiber detectors.

Further evidence of the suitability of the above described arrangement is the measurement of the coincidence timing of simultaneous events. FIG. 3 shows the timing spectrum for two BGO optical fiber detectors. A first 2×2×10 mm BGO crystal was attached, via a 30 cm fiber optic cable to a Phillips XP 1722 PMT. A second 2×2×10 mm BGO crystal was attached, via a 30 cm fiber optic cable to a standard single photo multiplier tube. With both crystals monitoring the same event, it was determined that the FWHM is about 11 ns. While this is twice as large as a conventional arrangement it is still adequate for use in scanning a living subject.

A typical use of the array described above is in a small PET scanner where 30 arrays are arranged in a ring surrounding the gamma ray source, the ring having a diameter of about 17.2 cm and an axial field of view of 1.8 cm. It has been found that a PET scanner using the circle of 30 arrays, recording the signals received within 20 ns of each other as being generated by simultaneous events, that an image equal or superior to those generated by prior art systems (scintillator arrays mounted directly on the assembly of four photomultiplier tubes) can be obtained. However, larger rings can be constructed using additional arrays. Further, the fiber optic linked system is easier to assemble, eliminates anomalies or lost data resulting from dead space between arrays because of low packing density or from mounting square arrays on round photomultiplier tubes, and results in very high spatial resolution.

While the invention has been described as using BGO scintillator crystals, various other scintillator crystals, such as lutetium oxyorthosilicate (LSO) can be used. Further, the MgO powder placed between the individual crystals can be replaced by various other opaque or nontransparent materials, preferably white powders, such as $Al_2O_3$, $BaSO_4$, and PTFE powder or tape or thin metallic films such as aluminum or silver which prevent light generated in one crystal from entering an adjacent crystal.

Figure 4:
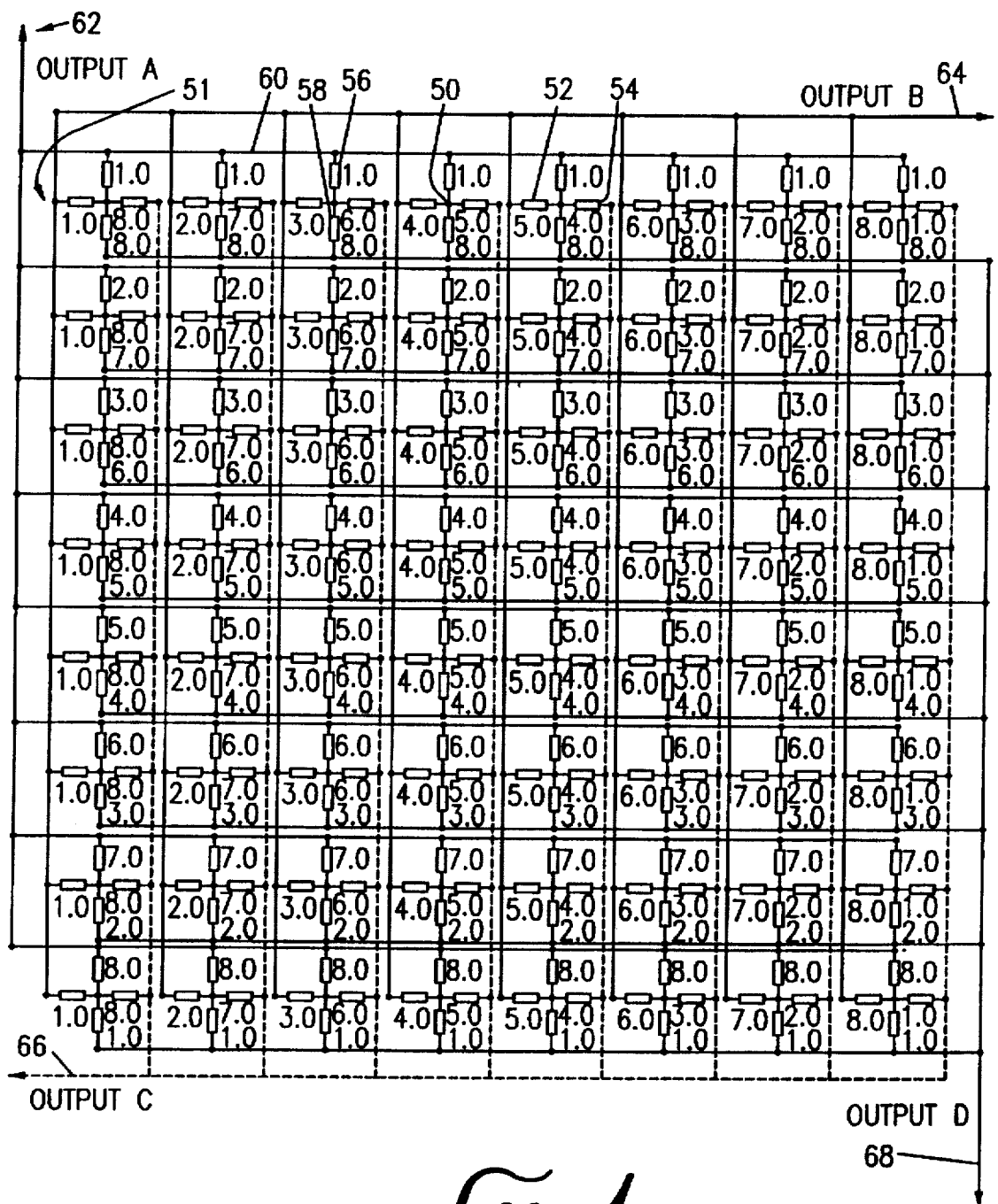
FIG. 4 shows a prior art arrangement of resistors used in locating the site of an activated target in a multichannel photomultiplier tube.

The invention further incorporates a less complicated and more efficient electronic method of determining the channel or pixel of the MC-PMT receiving the signal from the scintillator crystals, referred to as an electrode locating system. A typical MC-PMT includes a plate near the rear surface thereof with a square array of 64 discrete holes for receiving the channeled electrons generated by photons delivered to the MC-PMT. Mounted behind each hole is an electrode 50 to receive the electrons. These electrons are in turn connected to a system for measuring and comparing the number of electrons received at each electrode 50. Shown in FIG. 4 is an assembly of resistors typically attached to the rows 51 (horizontally spaced) and columns 53 (vertically spaced) of the electrodes 50 exiting the MC-PMT. In this arrangement each electrode has four resistors (52, 54, 56, 58) attached to it. If the assembly of electrodes 50 is viewed as being position in an x–y grid, two resistors 52, 54 are connected on opposite sides of the electrode 50 parallel to the x axis, the left resistor 52 being referred to as the negative x resistor and the right resistor 54 being referred to as the positive x resistor. Likewise, two resistors 56, 58 connected above and below respectively (on opposite sides of) the electrode 50 parallel to the y axis are referred to as the positive and negative y resistors 56, 58 respectively. The positive y electrodes 56 along a row 51 are then connected by an electrical conduit 60 (the positive y conduit) and the eight positive y conduits 60 are connected to provide output A 62. In a like manner the negative x resistors 52 are connected to provide output B 64, the positive x resistors 54 are connected to provide output C 66 and the negative y resistors are connected to provide output D 68. As can be seen from FIG. 4 each resistor, depending on its location, has a different value such that electrical flow from any one electrode will result in a different voltage being delivered to outputs A, B, C and D, thus allowing the location of the electrode receiving the electrons generated by the delivery of photons from a specific fiber optic and, in turn a specific crystal to be identified. The X location of an electrode is then given by the voltage at output C ($V_C$) divided by the sum of the voltages at outputs B and C ($V_B+V_C$). The Y location of an electrode is given by the voltage at output A ($V_A$) divided by the sum of the voltages at outputs A and D ($V_A+V_D$). As can be seen, this arrangement is complicated requiring the attachment of 256 resistors for an array of 64 crystals.

Figure 5:
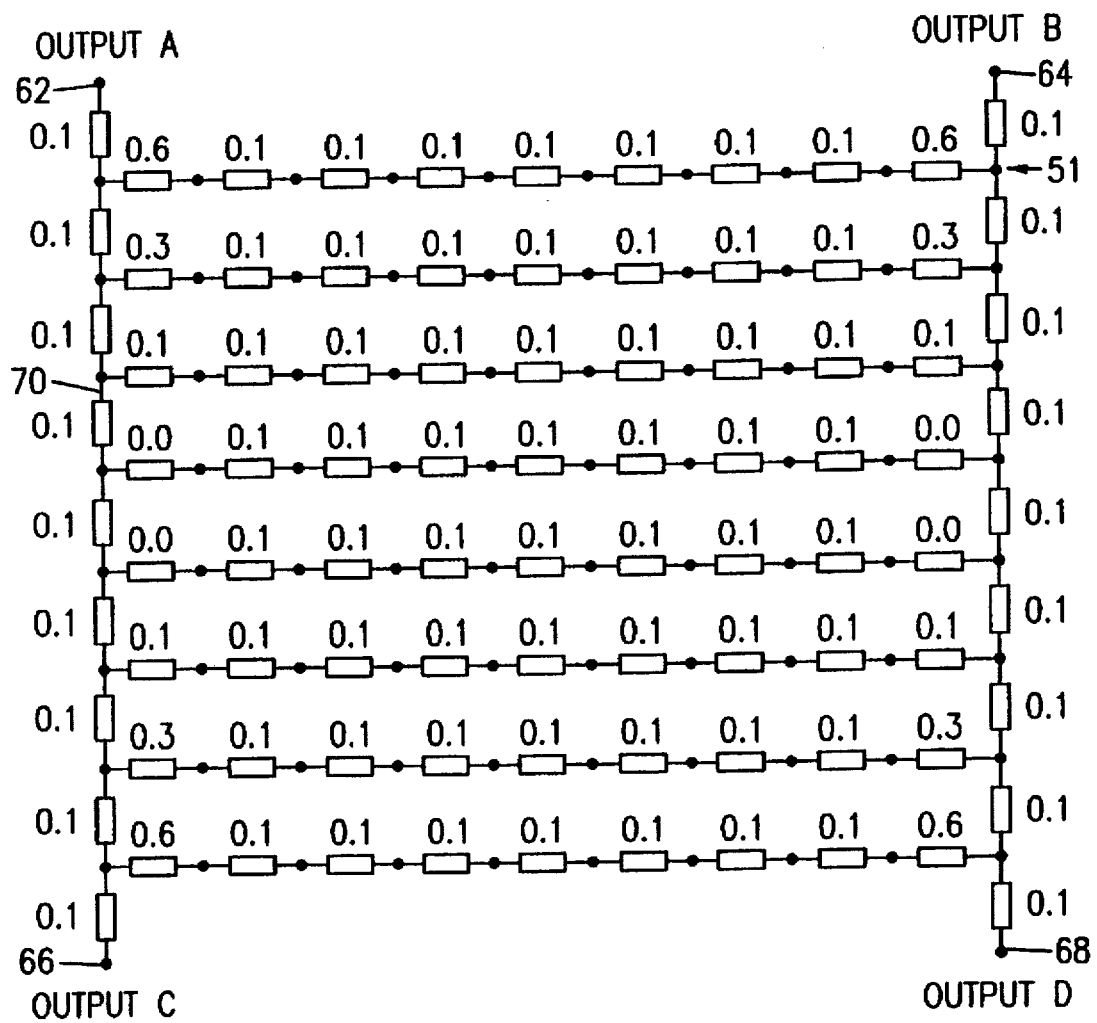
FIG. 5 shows an arrangement of resistors, embodying features of the invention used in locating the site of an activated target in a multichannel photomultiplier tube.

It has been found that the location of specific activated electrodes can be more easily identified by the circuit illustrated in FIG. 5. Only two resistors need be attached to each electrode along the row or column of electrodes. FIG. 5 shows a horizontal (row) arrangement. Further, except for the first and last resistor in each row, all the resistors are of the same value, for example 1 kΩ. Specifically, a 1 kΩ resistor is placed between each electrode in a row and a larger value resistor is connected to each of the outer electrodes in the row to form a horizontal conduit alternately composed of nine resistors and 8 electrodes. Each of the left ends of the horizontal conduits are then connected to form a vertical conduit 70 with a resistor connected between each adjacent horizontal conduit as well as on the end of the vertical conduit, the vertical conduit consisting alternatingly of nine resistors and the left end of the eight horizontal conduits. the upper and lower end of the vertical conduit functioning as output A and C 62,66. In like manner the right ends of the horizontal conduits are connected to form outputs B and D 64,68.

In the example shown in FIG. 5 the resistors in the vertical conduits are each 100 Ω and the resistors on the ends of the horizontal conduits have values from 0 to 600 Ω. This results in a current to voltage conversion similar to the configuration of FIG. 4 while requiring the use of only 90 resistors. The X position is then given by $(V_B+V_D)/(V_A+V_B+V_C+V_D)$ and the Y POSITION is given by $(V_A+V_B)/(V_A+V_B+V_C+V_D)$.

Figure 6:
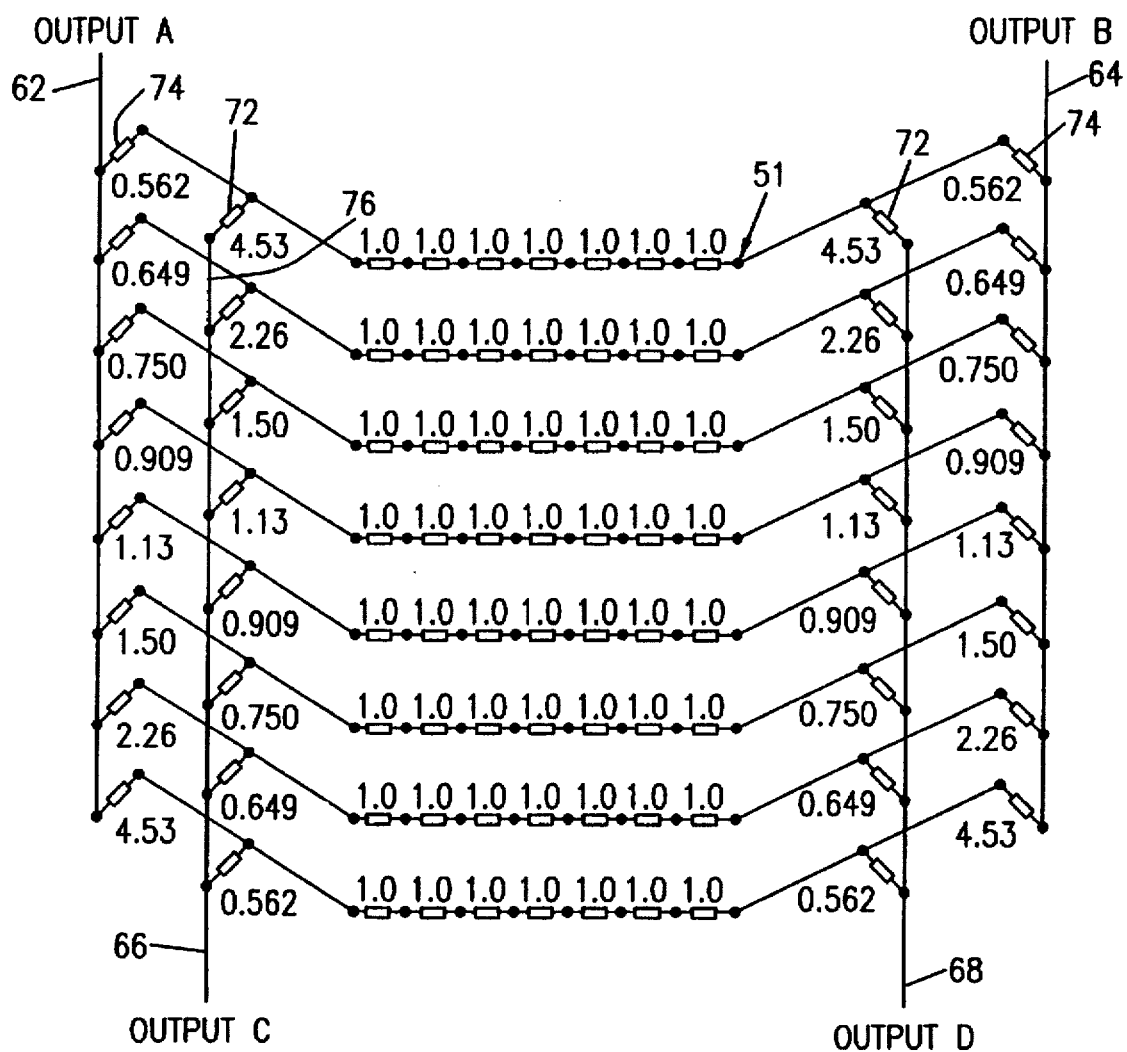
FIG. 6 shows a second arrangement of resistors, embodying features of the invention used in locating the site of an activated target in a multichannel photomultiplier tube.

FIG. 6 shows a variation of the location circuit shown in FIG. 5. In this variation the electrodes are connected only in the horizontal direction with a 1 kΩ resistor between the electrodes in a row. Connected to the outermost electrode in each row are a first and second resistor 72,74 in parallel. On the left side of the each row the first parallel resistors 72 are all connected to a single lead 76 with the current running to one end which is outlet C. Similarly, on the right side of each row the first resistors are connected to a single lead (output D) 68.

The second resistors 74 on the left and right side are connected in a like manner to form output A and B 62,64, respectively. The first and second resistors 72,74 in the output leads are of differing resistance varying from 4530 Ω at the end of the row furthest from the output end to 562 Ω nearest the voltage measuring point, the resistances being selected to give a desired voltage reading for an event at each particular electrode. In particular, the resistances, in order of their location are 4530, 2260, 1500, 1130, 909, 750, 649, and 562 Ω. This results in a current to voltage conversion similar to the configuration of FIGS. 4 and 5 while requiring the use of only 88 resistors. The formula for locating the X and Y position is the same as for the embodiment in FIG. 5.

While the locating circuits shown in FIGS. 5 and 6 above are improvements over the prior used locating circuits, those prior circuits, such as shown in FIG. 4 can be used with the detector/fiber optic/MC-PMT assembly described above. Used of the newly described locating circuits further improves the utility of the sensor assembly. Additionally the improved locating circuit can be used with prior art scintillator/MC-PMT structures resulting in improvement to those devices.

Although the present invention has been described in considerable detail with reference to certain preferred versions and uses thereof, other versions and uses are possible. For example, various different scintillator crystals can be used, the fiber optic material can be varied, or the adhesive used to assemble the system can be varied without departing from the invention taught herein. In the locating circuits the values of the resistors can be changed without departing from the intent of the inventors as long as the voltages read on each output, and the combination thereof can be used to identify the location of an electrode being bombarded by electrons. Therefore, the spirit and scope of the appended claims should not be limited to the description of the preferred versions contained herein.

What is claimed is:

1. A gamma ray detection system comprising an array of multiple scintillating crystals, each crystal having a first end of an optical fiber attached thereto, a second end of said optical fiber being attached to a light receiving surface of a multichannel photomultiplier tube, said multi-channel photo multiplier tube having an output surface containing an array of electrodes arranged in rows, there being more than one row of electrodes with the same number of electrodes in each row, each electrode being capable of emitting electrons in response to stimulation of an identifiable portion of the light receiving surface, the output surface of the photo multiplier tube having attached thereto a circuit comprising a resistor attached between each subsequent electrode in a row, each row of attached electrodes having a first and second end, the first ends being connected in series to a first electrical conduit, the first electrical conduit having a resistor positioned along the conduit between each first end of each row, the first conduit having a first end and a second end each configured for determining a voltage output therefrom, each row of attached electrodes also being connected in series at its second end to a second electrical conduit, the second electrical conduit having a resistor positioned along the conduit between each first end of each row, the second electrical conduit having a first end and a second end each configured for determining a voltage output therefrom.

2. A gamma ray detection system comprising an array of multiple scintillating crystals, each crystal having a first end of an optical fiber attached thereto, a second end of said optical fiber being attached to a light receiving surface of a multichannel photomultiplier tube, said multi-channel photo multiplier tube having an output surface containing an array of electrodes arranged in rows, there being more than one row of electrodes with the same number of electrodes in each row, each electrode being capable of emitting electrons in response to stimulation of an identifiable portion of the light receiving surface, the output surface of the photo multiplier tube having, attached thereto a circuit comprising a resistor attached between each subsequent electrode in a row, each row of attached electrodes having a first and second end, the first ends being connected to a first and second conduit, a first resistor being positioned between the first end and the first conduit and a second resistor being positioned between the first end and the second conduit, the first conduit and the second conduit each having an end configured for determining a voltage output therefrom, each row of attached electrodes also being connected at a second end to a third and fourth conduit, a third resistor being positioned between the second end and the third conduit and a fourth resistor being positioned between the second end and the fourth conduit, the third and fourth conduit each having an end configured for determining a voltage output therefrom.

* * * * *